(12) United States Patent
Matsuda et al.

(10) Patent No.: US 10,102,156 B2
(45) Date of Patent: Oct. 16, 2018

(54) DISPLAY APPARATUS, DISPLAY CONTROL METHOD, AND COMPUTER READABLE RECORDING MEDIUM

(71) Applicant: Sharp Kabushiki Kaisha, Sakai, Osaka (JP)

(72) Inventors: Yukio Matsuda, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/716,552

(22) Filed: Sep. 27, 2017

(65) Prior Publication Data

US 2018/0089111 A1    Mar. 29, 2018

(30) Foreign Application Priority Data

Sep. 29, 2016 (JP) .................. 2016-192032

(51) Int. Cl.
| | |
|---|---|
| *G06F 13/10* | (2006.01) |
| *G06Q 30/02* | (2012.01) |
| *G06F 13/14* | (2006.01) |
| *G06Q 30/06* | (2012.01) |
| *H04W 4/14* | (2009.01) |
| *H04L 29/08* | (2006.01) |
| *H04W 4/18* | (2009.01) |

(52) U.S. Cl.
CPC ............. *G06F 13/10* (2013.01); *G06F 13/14* (2013.01); *G06Q 30/02* (2013.01); *G06Q 30/06* (2013.01); *H04W 4/14* (2013.01)

(58) Field of Classification Search
CPC ......... G06F 13/10; G06F 13/14; G06Q 30/02; G06Q 30/06; H04W 4/14
USPC ....... 340/7.51–7.55, 7.21; 455/38.4; 715/752
See application file for complete search history.

(56) References Cited

U.S. PATENT DOCUMENTS

| | | | | |
|---|---|---|---|---|
| 6,032,025 A * | 2/2000 | Sugio | .................. | G08B 5/226 |
| | | | | 340/7.56 |
| 6,633,224 B1 * | 10/2003 | Hishida | .................. | G08B 5/229 |
| | | | | 340/7.2 |
| 9,274,666 B2 * | 3/2016 | Shin | ........................ | G06F 3/048 |

(Continued)

FOREIGN PATENT DOCUMENTS

| | | |
|---|---|---|
| JP | 2008-233233 A | 10/2008 |
| JP | 2012-160111 A | 8/2012 |

*Primary Examiner* — Nam V Nguyen
(74) *Attorney, Agent, or Firm* — Keating & Bennett, LLP

(57) ABSTRACT

A display apparatus including a display that displays messages includes a message retrieval unit that retrieves messages by accessing a message management server, a display method selection unit that selects a display method for the retrieved messages in response to a count of the retrieved messages, and a display controller that performs control to display on the display the messages retrieved from the message management server in the display method selected by the display method selection unit. The display method selection unit selects a first display method that displays the retrieved messages while scrolling the retrieved messages repeatedly if the count of the retrieved messages is equal to or below a display switching threshold value, and selects a second display method that displays the retrieved messages while scrolling the retrieved messages if the count of the retrieved messages is above the display switching threshold value.

13 Claims, 17 Drawing Sheets

(56) References Cited

U.S. PATENT DOCUMENTS

| | | | | |
|---|---|---|---|---|
| 9,578,085 B2* | 2/2017 | Smith | .................... | H04L 67/02 |
| 2007/0238487 A1* | 10/2007 | Kuhl | ....................... | H04M 1/56 |
| | | | | 455/566 |
| 2008/0225815 A1* | 9/2008 | Minear | .................. | G06Q 30/02 |
| | | | | 370/338 |
| 2010/0107190 A1* | 4/2010 | Lee | .................... | H04N 7/17318 |
| | | | | 725/32 |
| 2014/0282085 A1* | 9/2014 | Hsu | ......................... | H04L 51/24 |
| | | | | 715/752 |

* cited by examiner

| REPRODUCTION SCHEDULE | TIME TABLE | | PROGRAM LIST | |
|---|---|---|---|---|
| | START TIME | END TIME | NAME OF CONTENT | REPRODUCTION TIME |
| JANUARY 27, 2016 | 8:00 | 11:00 | welcome1.jpg morning.jpg | 30 SECONDS 30 SECONDS |
| EVERY TUESDAY | 11:00 | 14:00 | welcome1.jpg morning.jpg | 30 SECONDS 30 SECONDS |
| ⋮ | ⋮ | ⋮ | ⋮ | ⋮ |

| LOGIN ID | PASSWORD | SEARCH INFORMATION |
|----------|----------|--------------------|
| user1 | abcdef | #sp |

| PARAMETER | CONFIGURED VALUE |
|-----------|------------------|
| mt | 10 (ITEMS) |
| T | 300 (SECONDS) |

DISPLAY APPARATUS, DISPLAY CONTROL METHOD, AND COMPUTER READABLE RECORDING MEDIUM

BACKGROUND

1. Field

The present disclosure relates to a display apparatus having a display that displays a message.

2. Description of the Related Art

Mechanisms (digital signage, for example) are widely used to spread information, including advertisements, sales promotion and space performance information, and/or a variety of guidance information, using an electronic display apparatus in public venue, such as shop fronts, outdoor public space, shopping malls, event venues, amusement facilities, and/or public institutions.

As an example of such a system, Japanese Unexamined Patent Application Publication No. 2008-233233 discloses an electronic public notice system that is to be viewed by an unspecified large number of users. The electronic public notice system includes a receiving unit that receives a message related to an electronic public notice and transmitted from an unspecified large number of users, an identifying unit that receives position information of a user who has transmitted the message, and identifies an electronic public notice that reflects the message, based on the position information and distribution information of a specified type of electronic notice, and a display controller that ensures a message display region for the identified electronic notice and causes the message to be displayed on the message display region.

The messages to be displayed include a message that is created using social networking service (SNS), in addition to a message prepared in advance. Japanese Unexamined Patent Application Publication No. 2012-160111 discloses a message display system S. The message display system S includes a message display apparatus A, and a twitter management server B. The twitter management server B stores messages. The message display apparatus A communicates with the twitter management server B, causes the twitter management server B to search for a message according to a keyword, retrieves a hit message (a message hit in the searching) from the twitter management server B, and displays the hit message with a pattern in a time-sequence fashion during a first period of time.

It is contemplated that the message described with reference to Japanese Unexamined Patent Application Publication No. 2012-160111 is displayed in the electronic public notice system disclosed in Japanese Unexamined Patent Application Publication No. 2008-233233. A message, such as on SNS, is typically displayed on a terminal apparatus that is operated by a user. If an older message is displayed, the user typically operates the terminal apparatus. In the case of a simple display apparatus, such as digital signage, the user simply views the display apparatus, and is unable to operate it. A suitable message is not displayed.

A message transmission frequency through SNS is varied. If a message is displayed on digital signage of related art, appropriately displaying the message is difficult. More specifically, with a lower displaying rate (the number of displays per unit time is smaller), the retrieved messages are difficult to be displayed if the count of the messages is too high. With a higher displaying rate (the number of displays per unit time is larger), a message display region has a pronounced empty area where no message is displayed if the count of the messages is too low.

A display that is used in digital signage which is not operated by a user as a viewer has difficulty in displaying a message appropriately.

SUMMARY

It is desirable to provide a display apparatus that displays to a message to a user appropriately by switching a display method when the message is displayed.

According to an aspect of the disclosure, there is provided a display apparatus including a display that displays messages. The display apparatus includes a message retrieval unit that retrieves messages by accessing a message management server, a display method selection unit that selects a display method for the messages in response to a count of the retrieved messages, and a display controller that performs control to display on the display the messages retrieved from the message management server in the display method selected by the display method selection unit. The display method selection unit selects a first display method that displays the retrieved messages while scrolling the retrieved messages repeatedly if the count of the retrieved messages is equal to or below a display switching threshold value, and selects a second display method that displays the retrieved messages while scrolling the retrieved messages if the count of the retrieved messages is above the display switching threshold value.

According to another aspect of the disclosure, there is provided a display control method. The display control method for a display apparatus having a display that displays messages, includes retrieving messages by accessing a message management server, selecting a display method for the messages in response to a count of the retrieved messages, and performing control to display on the display the messages retrieved from the message management server in the selected display method. The selecting includes selecting a first display method that displays the retrieved messages while scrolling the retrieved messages repeatedly if the count of the retrieved messages is equal to or below a display switching threshold value, and selecting a second display method that displays the retrieved messages while scrolling the retrieved messages if the count of the retrieved messages is above the display switching threshold value.

According to another aspect of the disclosure, there is provided a computer readable recording medium causing a computer having a display that displays messages to perform a process of displaying messages. The process includes retrieving messages by accessing a message management server, selecting a display method for the messages in response to a count of the retrieved messages, and performing control to display on the display the messages retrieved from the message management server in the selected display method. The selecting includes selecting a first display method that displays the retrieved messages while scrolling the retrieved messages repeatedly if the count of the retrieved messages is equal to or below a display switching threshold value, and selecting a second display method that displays the retrieved messages by scrolling the retrieved messages if the count of the retrieved messages is above the display switching threshold value.

DESCRIPTION OF THE EMBODIMENTS

Embodiments of the present disclosure are described with reference to the drawings. A display apparatus described in the embodiments is a large-scale digital signage display apparatus that displays content.

1. First Embodiment 1.1 Entire Configuration

Figure 1:
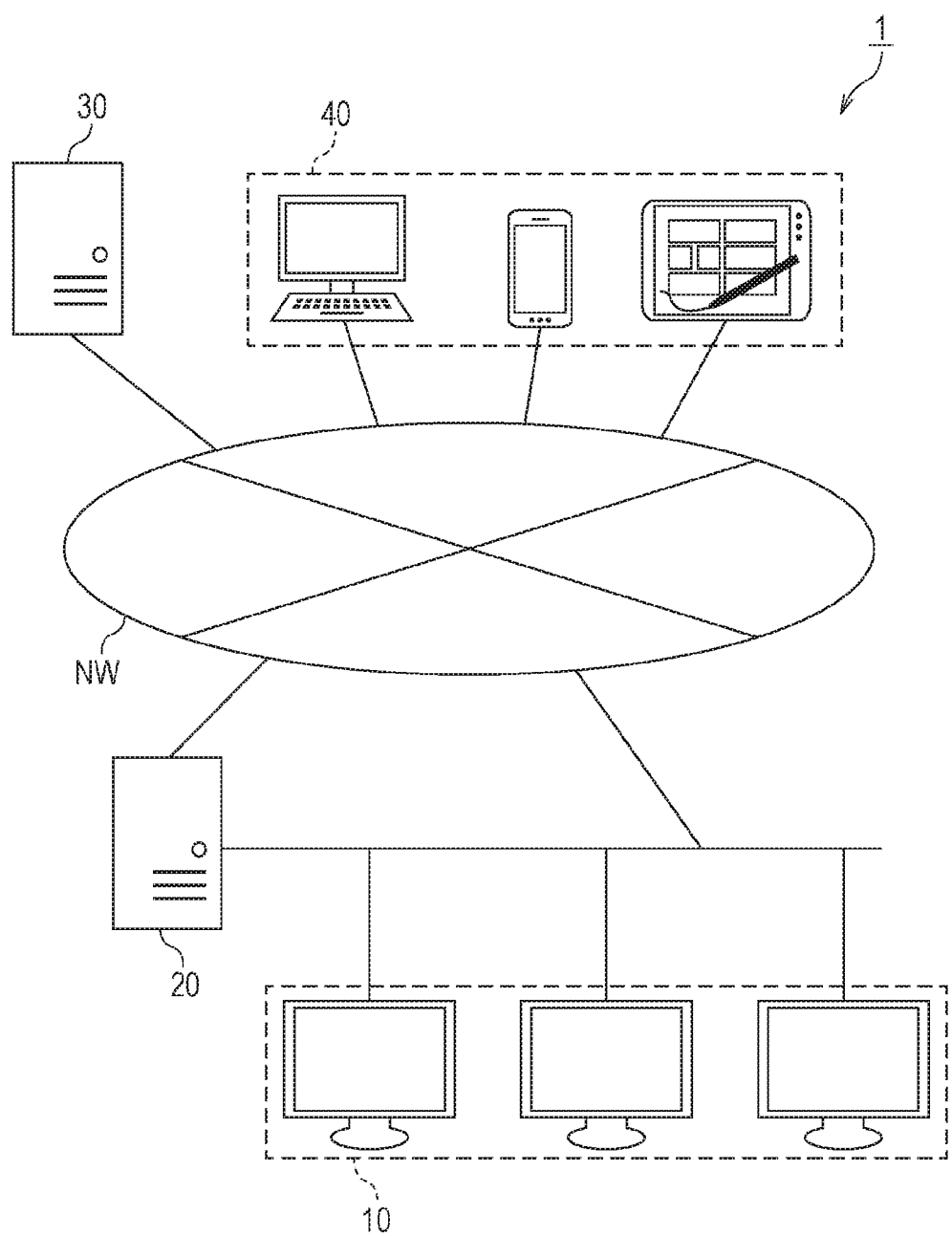
FIG. 1 illustrates a whole system of a first embodiment.

FIG. 1 illustrates a configuration of a whole message display system 1. The message display system 1 includes one or more display apparatuses 10 and a management apparatus 20 connected to the display apparatuses 10. Each of the display apparatuses 10 is connected to the management apparatus 20 via an external network NW. The external network NW is the Internet, for example.

The display apparatus 10 is capable of displaying content contained in a program delivered from the management apparatus 20. The display apparatus 10 may be a liquid-crystal display, an organic electroluminescent (EL) display, a light-emitting diode (LED) display, or the like. The display apparatus 10 also displays a message received from a message management server 30.

The management apparatus 20 manages one or more display apparatuses 10. A content provider, an information provider, or an advertisement distributor registers content (program) onto the management apparatus 20. The registered program is delivered to each display apparatus 10 in accordance with a schedule configured on the management apparatus 20.

The word content in the context of the embodiments refers to any of a still image, a video, an audio, and text. The content to be delivered may be content registered (stored) on the management apparatus 20 or may be content stored on an external server.

The external network NW connects to the message management server 30 that provides a message service. The message management server 30 manages a message received from a terminal apparatus 40 via the external network NW.

Through the message service, users may share text and images. For example, if a user transmits a message from the terminal apparatus 40, the message management server 30 receives the message. The message management server 30 then displays the message on time line in the message service. Another user may receive and display the message using the terminal apparatus 40, such as a portable information terminal apparatus (like a smart phone or a tablet). Examples of the message service include Twitter (registered trademark), Instagram (registered trademark), LINE (registered trademark), Facebook (registered trademark), Sina-Weibo (registered trademark), and Google+ (registered trademark).

By placing a specific character string in a message, only messages having the same character string may be displayed. For example, if a character string "#sp" is added to a message, another user may display only the messages containing the character string "#sp". Such a character string is referred to as a "hash tag".

1.2 Functional Configuration 1.2.1 Display Apparatus

Figures 2, 3:
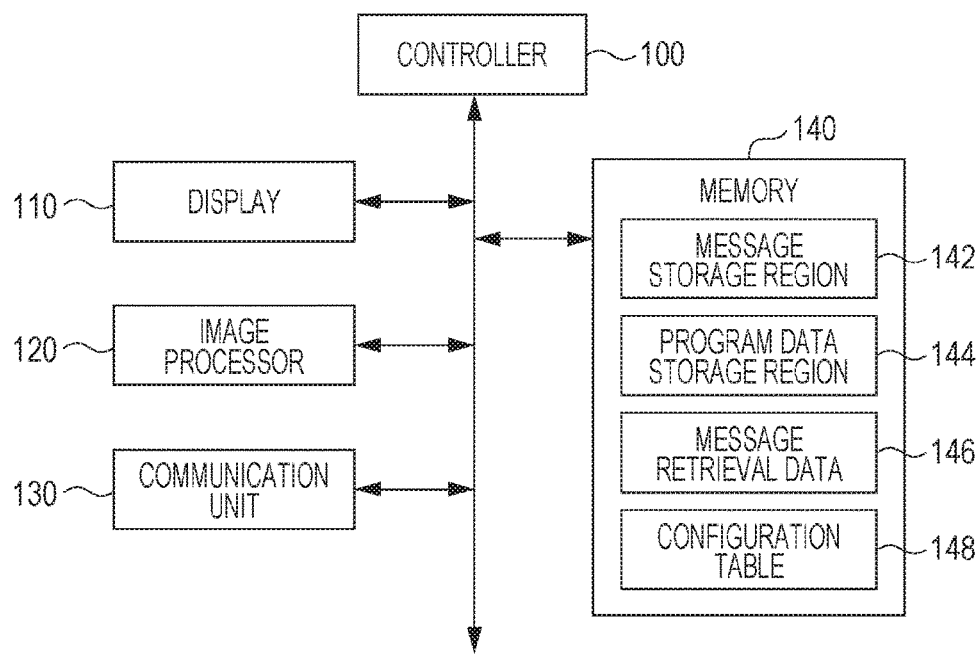
FIG. 2 illustrates a functional configuration of a display apparatus of the first embodiment.
FIG. 3 illustrates a configuration example of a program data storage region of the first embodiment.

A functional configuration of the display apparatus 10 of the first embodiment is described with the drawings. As illustrated in FIG. 2, in terms of the functional configuration, the display apparatus 10 includes a controller 100, a display 110, an image processor 120, a communication unit 130, and a memory 140.

The controller 100 controls the entire display apparatus 10. The controller 100 implements a variety of programs by reading and executing a variety of programs stored on the memory 140. The controller 100 includes a central processing unit (CPU), for example.

The display 110 displays an image, and includes a liquid-crystal display (LCD) or the like. The display 110 displays delivered content and a received message.

The image processor 120 processes an image to be displayed on the display 110. For example, the image processor 120 performs control to display a message on content, or display a message while scrolling the message.

The communication unit 130 is connected to a network. The communication unit 130 may include an interface that is connected to a wired local-area network (LAN), a wireless LAN, or a long term evolution (LTE) network. With the communication unit 130 connected to the network, the display apparatus 10 is connected to the management apparatus 20 and the external network NW.

The memory 140 stores a variety of programs and data used for the display apparatus 10 to operate. The memory 140 may include a semiconductor memory and a hard disk drive (HDD).

The memory 140 includes a message storage region 142, and a program data storage region 144, and stores message retrieval data 146, and a configuration table 148.

The message storage region 142 stores messages received from the message management server 30. The messages stored on the message management server 30 may include all the messages received during a specific time period or only a new message that has been just received.

The display apparatus 10 may receive all messages corresponding to a login ID of the message service to be described below, and store the received messages on the memory 140. Alternatively, the display apparatus 10 may search for only messages having the hash tag, and store the hit messages on the memory 140.

The program data storage region 144 stores a program delivered from the management apparatus 20. A data structure of the program data storage region 144 is described with reference to FIG. 3.

The program data storage region 144 stores a reproduction schedule of the program (Jan. 26, 2016, for example), a time table of the reproduction of the program listing a start time (8:00, for example) and an end time (11:00, for example), and a program list listing content names (content data, such as welcom1.jpg), and reproduction time (30 seconds, for example).

The display apparatus 10 displays content, stored as content data, on a per reproduction schedule basis. The program data is typically created with the management apparatus 20 and then delivered to the display apparatus 10. Alternatively, the program data may be created with the display apparatus 10.

An apparatus on which a program creating the program data runs may create the program data. For example, a user may generate the program data on a portable personal computer, and cause the display apparatus 10 to store the program data (for example, the user may copy the program data using a universal serial bus (USB) memory).

The message retrieval data 146 is information that is used to retrieve a message from the message management server 30. A login operation on the message management server 30 includes logging in for the message service provided by the message management server 30.

The message retrieval data 146 is information received from the management apparatus 20. Alternatively, the message retrieval data 146 may be configured in the display apparatus 10.

Figures 4, 5, 6:
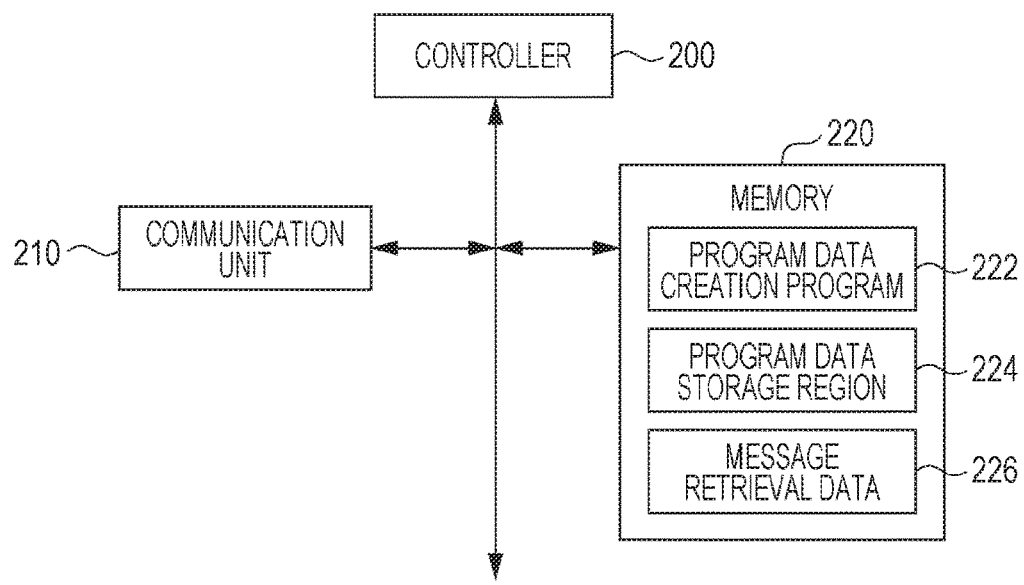
FIG. 4 illustrates a configuration example of a message retrieval data of the first embodiment.
FIG. 5 illustrates a configuration example of a configuration table of the first embodiment.
FIG. 6 illustrates a functional configuration of a management apparatus of the first embodiment.

FIG. 4 illustrates an example of the message retrieval data 146. The message retrieval data 146 includes, as login information, a login identity ("user1", for example) and a password ("abcdef", for example). The user logs in for the message service using the login ID and password. The login information may be an access token, for example. Alternatively, OAuth authentication may be performed using an external service.

The message stored on the message management server 30 may include search information according to which the display apparatus 10 performs a search operation. In accordance with the first embodiment, the search information is a hash tag, for example. Alternatively, the search information may be any search character string, a user ID, position information, or time (for example, one hour earlier than message retrieval). The search information may not necessarily have to be stored.

In message searching, the display apparatus 10 displays a message that satisfies a search condition. A variety of search methods are contemplated. For example, the display apparatus 10 transmits the search information (such as a search keyword like a desired character string or tag) to the message management server 30. The message management server 30 extracts a message containing the search information (or not containing the search information), and transmits the extracted message to the display apparatus 10.

The display apparatus 10 may receive the message from the message management server 30, and extract a desired message from the received messages in accordance with the search information. Alternatively, the display apparatus 10 may transmit the search information to the management apparatus 20 for storage, and extracts from messages a message that satisfies the search condition, and then displays the message thereon.

The configuration table 148 stores a configuration value for each parameter. The management apparatus 20 typically configures the value. Alternatively, the user may configure the value for each parameter on each display apparatus 10.

As illustrated in FIG. 5, the configuration table 148 stores, as the parameters, a display switching threshold value mt ("10", for example) for use in switching the message display method and time indicating a timing T ("300" for example) for receiving a message from the message management server 30 (message retrieval time).

1.2.2 Management Apparatus

A functional configuration of the management apparatus 20 is described with reference to FIG. 6. The management apparatus 20 includes, at least, a controller 200, a communication unit 210, and a memory 220.

The controller 200 generally controls the management apparatus 20. The controller 200 implements a variety of functionalities by reading and executing a variety of programs stored on the memory 220. The controller 200 includes a central processing unit (CPU).

The communication unit 210 is connected to a network. For example, the communication unit 210 includes an interface that is connectable to a wired LAN, a wireless LAN, or an LTE network. With the communication unit 210 connected to the network, the management apparatus 20 is connected to the display apparatus 10 and the external network NW.

The memory 220 stores a variety of programs and data that the management apparatus 20 uses in the operation thereof. The memory 220 may include a semiconductor memory and a hard disk drive (HDD).

The memory 220 includes a program data storage region 224, and stores a program data creation program 222 thereon. The program data creation program 222 generates program data. By executing the program data creation program 222, the management apparatus 20 creates the program data, and then stores the program data onto the program data storage region 224.

The program data stored on the program data storage region 224 is to be delivered to the display apparatus 10 via the communication unit 210.

The memory 220 further stores message retrieval data 226. The message retrieval data 226 is used when the display apparatus 10 retrieves a message from the message management server 30 (in the message service).

1.2.3 Message Management Server

Figure 7:
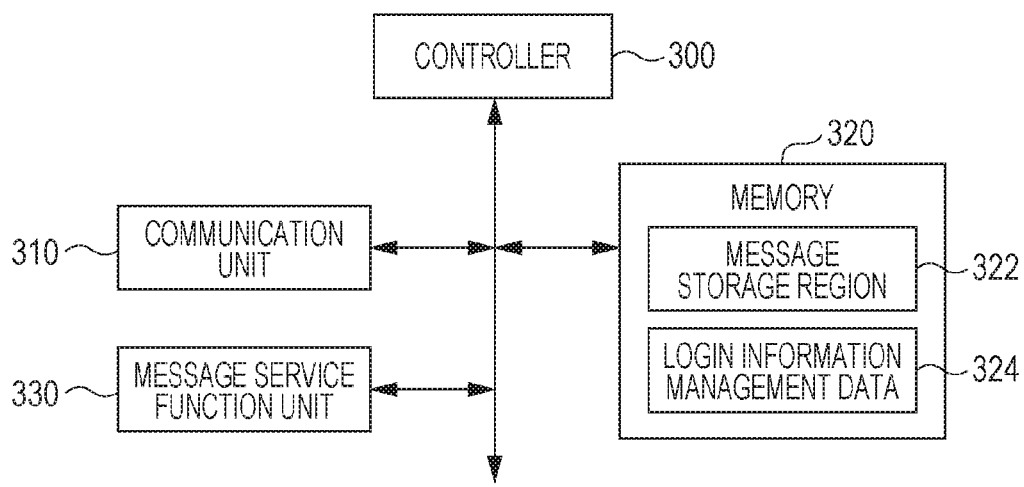
FIG. 7 illustrates a functional configuration of a message management server of the first embodiment.

A functional configuration of the message management server 30 is described with reference to FIG. 7. The message management server 30 includes, at least, a controller 300, a communication unit 310, a memory 320, and a message service function unit 330.

The controller 300 generally controls the message management server 30. By reading and executing a variety of programs stored on the memory 320, the controller 300 implements a variety of functionalities. The controller 300 includes a CPU, for example.

The communication unit 310 is connected to a network. For example, the communication unit 310 includes an interface that is connectable to a wired LAN, a wireless LAN, or an LTE network. With the communication unit 310 connected to the network, the message management server 30 is connected to the management apparatus 20 and the external network NW.

The memory 320 stores a variety of programs and data that the message management server 30 uses in the operation thereof. The memory 320 may include a semiconductor memory and a hard disk drive (HDD).

The memory 320 includes a message storage region 322, and stores login information management data 324. A message transmitted from the terminal apparatus 40 is stored on the message storage region 322.

The login information management data 324 includes user information that is used to log in for the message service provided by the message management server 30. The message service is available when the login information matches the user information when the terminal apparatus 40 or the display apparatus 10 performs a login operation.

The message service function unit 330 provides the message service. For example, the message service function unit 330 displays a message, received from the terminal apparatus 40, as the time line or to a related user (such a user who follows the time line). The message service also includes the exchanging of text information through Twitter, or the exchanging of images through Instagram.

1.2.4 Terminal Apparatus

Figure 8:
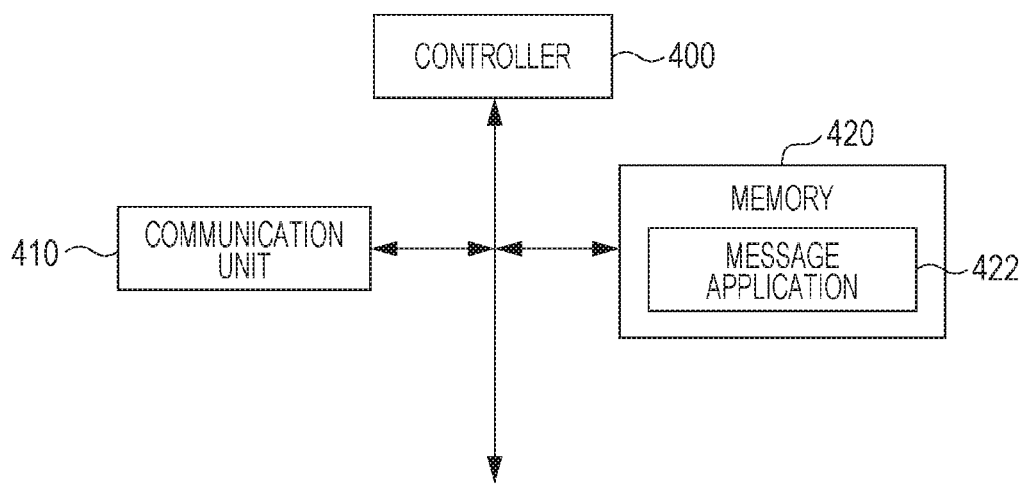
FIG. 8 illustrates a functional configuration of a terminal apparatus of the first embodiment.

A functional configuration of a terminal apparatus 40 is described with reference to FIG. 8. The terminal apparatus 40 includes, at least, a controller 400, a communication unit 410, and a memory 420.

The controller 400 generally controls the terminal apparatus 40. The controller 400 implements a variety of functionalities by reading and executing a variety of programs stored on the memory 420. The controller 400 includes a CPU.

The communication unit 410 is connected to a network. For example, the communication unit 410 includes an interface that is connectable to a wired LAN, a wireless LAN, or an LTE network. With the communication unit 410 connected to the network, the terminal apparatus 40 is connected to the message management server 30 and/or the external network NW.

The memory 420 stores a variety of programs and data that the terminal apparatus 40 uses in the operation thereof. The memory 420 may include a semiconductor memory and a hard disk drive (HDD).

The memory 420 stores a message application 422. The terminal apparatus 40 transmits a message to the message management server 30, or receives a message from the message management server 30, or displays a message thereon by starting up and executing the message application 422. The terminal apparatus 40 may not necessarily have to store and execute the message application 422. The message application 422 may be executed by accessing the message management server 30 via a browser.

1.3 Procedure

A procedure of the message display system 1 is described below.

1.3.1 Entire Sequence Chart

Figure 9:
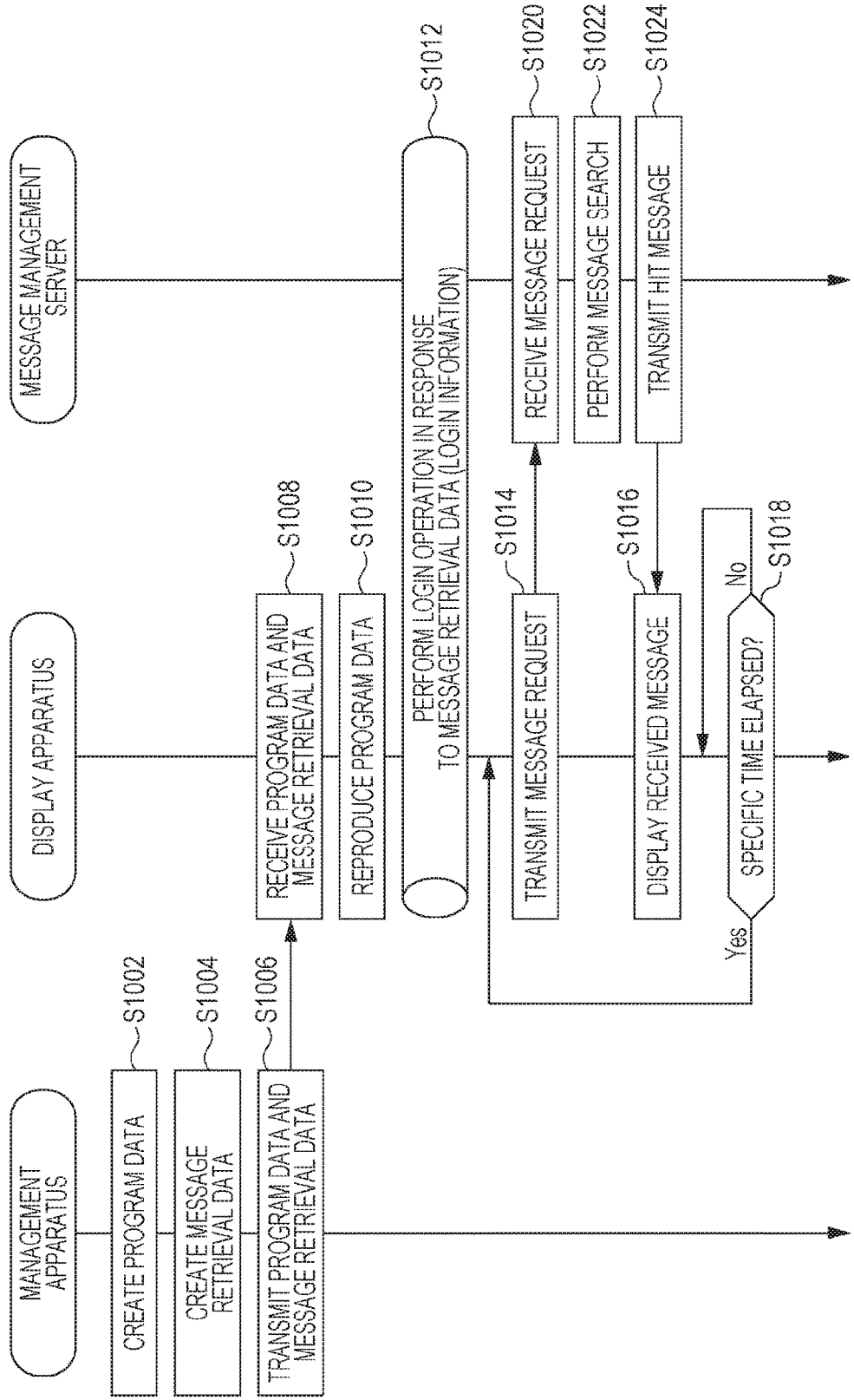
FIG. 9 illustrates a procedure (whole sequence) of the first embodiment.

FIG. 9 illustrates the procedure (whole sequence) of the first embodiment, indicating a sequence chart of the display apparatus 10, the management apparatus 20, and the message management server 30.

The management apparatus 20 creates the program data (step S1002). The management apparatus 20 also creates the message retrieval data (step S1004). The message retrieval data includes the login information including a user ID and password, and the search information.

The management apparatus 20 transmits the created program data and message retrieval data to the connected display apparatus 10 (step S1006).

When the display apparatus 10 receives the program data and message retrieval data (step S1008), the display apparatus 10 reproduces the program data (step S1010). The display apparatus 10 logs in for the message service to retrieve a message that is to be displayed together. More specifically, the display apparatus 10 performs a login operation, based on the login information included in the message retrieval data (step S1012).

When the login operation has been performed correctly, the display apparatus 10 transmits a message request (step S1014). The message request includes the search information.

In response to the reception of the message request (step S1020), the message management server 30 performs a message search, based on the search information included the message request (step S1022). The message management server 30 transmits, as search results, a message hit in the search operation (step S1024). As described above, the search operation may be performed by the display apparatus 10.

In response to the reception of the message, the display apparatus 10 displays the received message (step S1016). If a specific period of time has elapsed (yes branch from step S1018), the display apparatus 10 iterates the operations, starting with step S1014, and retrieves a new message from the message management server 30.

1.3.2 Routine Process

A routine process of the display apparatus 10 is described below with reference to FIG. 10. In the routine process, the display apparatus 10 has received from the management apparatus 20 the program data and message retrieval data, and is reproducing (displaying) the program data.

The display apparatus 10 logs in for the message service, using the message retrieval data (step S102). The display apparatus 10 initializes variables in use (step S104).

More specifically, the latest message count nt indicating the latest message is initialized to zero, and an initial display location vLINE indicating an initial display location of the message is initialized to 1.

The display apparatus 10 transmits the message request to the message management server 30 (step S106). If a new message has arrived (yes branch from step S108), the display apparatus 10 receives the new message (step S110), and stores a received new message count onto a newly received message count mk (step S112). The received messages are sequentially stored on a message array MSG(x).

Each newly received message is additionally stored onto the message array MSG(x) that includes the previously received messages. The message array MSG(x) may be initialized at any timing, or at the startup or end of the program. Alternatively, the message array MSG(x) may be initialized at specific time intervals, at specific time, or in response to a command from the management apparatus 20 or the like.

If there is no new message (no branch from step S108), operations in steps S110 and S112 are not performed.

The display apparatus 10 updates the latest message number nt (step S114). More specifically, the count mk of the newly received messages is added to the latest message count nt. The latest message number nt is equal to the latest message count.

If the latest message count mk is equal to or below a display switching threshold value mt that is stored as a configured value (no branch from step S116), the display apparatus 10 displays the message in a first pattern display process (step S118). Even if the displaying of the message in the first pattern display process is complete, but if message retrieval time T has not elapsed (no branch from step S120), the first pattern display process is performed again (step S118). The message retrieval time T is a time period throughout which messages are periodically retrieved. In other words, the first pattern display process is repeated until the message retrieval time T has elapsed, and thus the displaying of the message is repeated.

If the latest message count mk is above the display switching threshold value mt (yes branch from step S116), then the message is displayed in a second pattern display process (step S122).

If a command to end the process has not been issued (no branch from step S124), the display apparatus 10 repeats the routine, starting with step S106. A new message is thus received and displayed. If the command to end the process has been issued (yes branch from step S124), the process ends.

1.3.3 First Pattern Display Process

Figure 10:
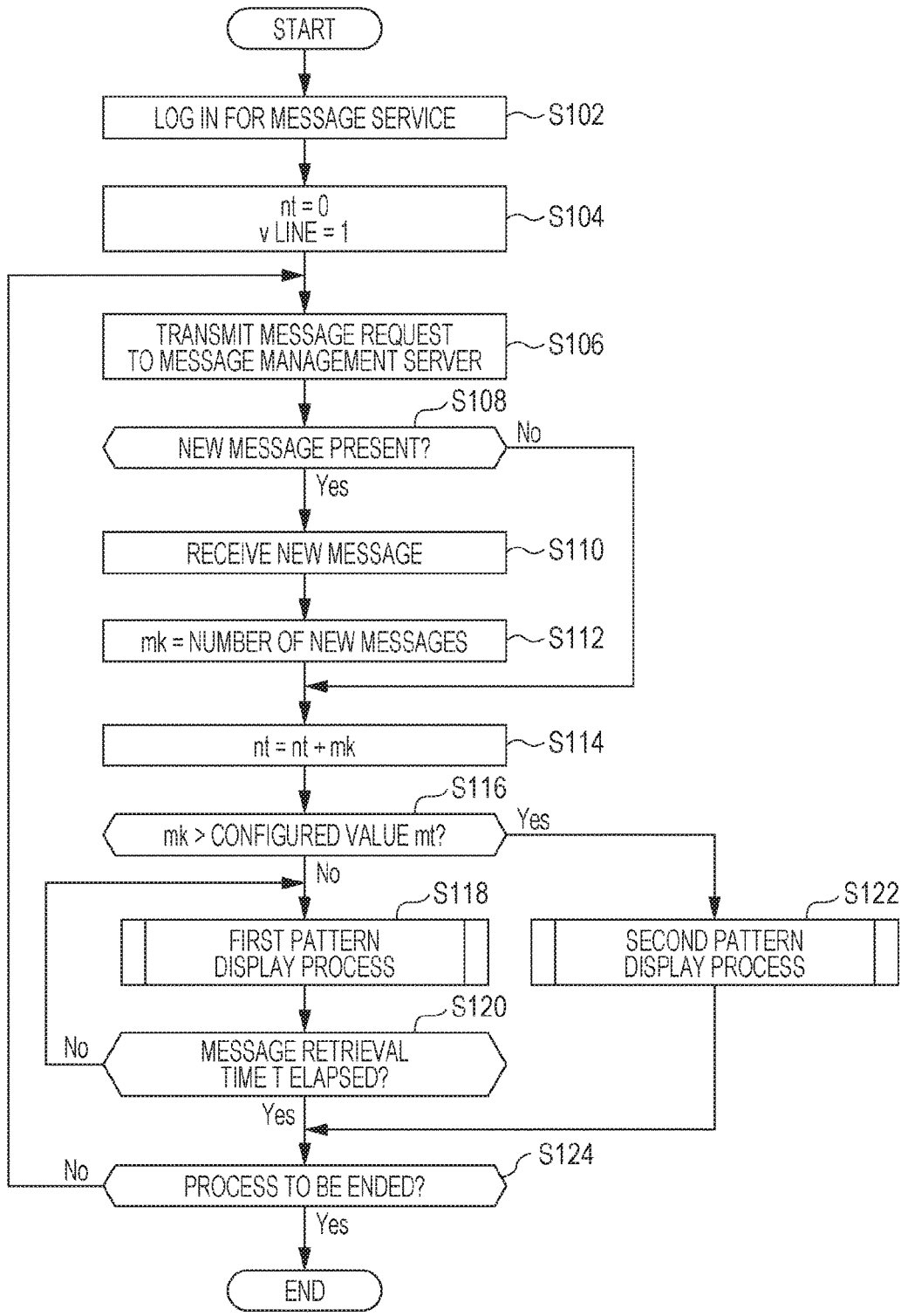
FIG. 10 illustrates a routine process of the first embodiment.
Figure 11:
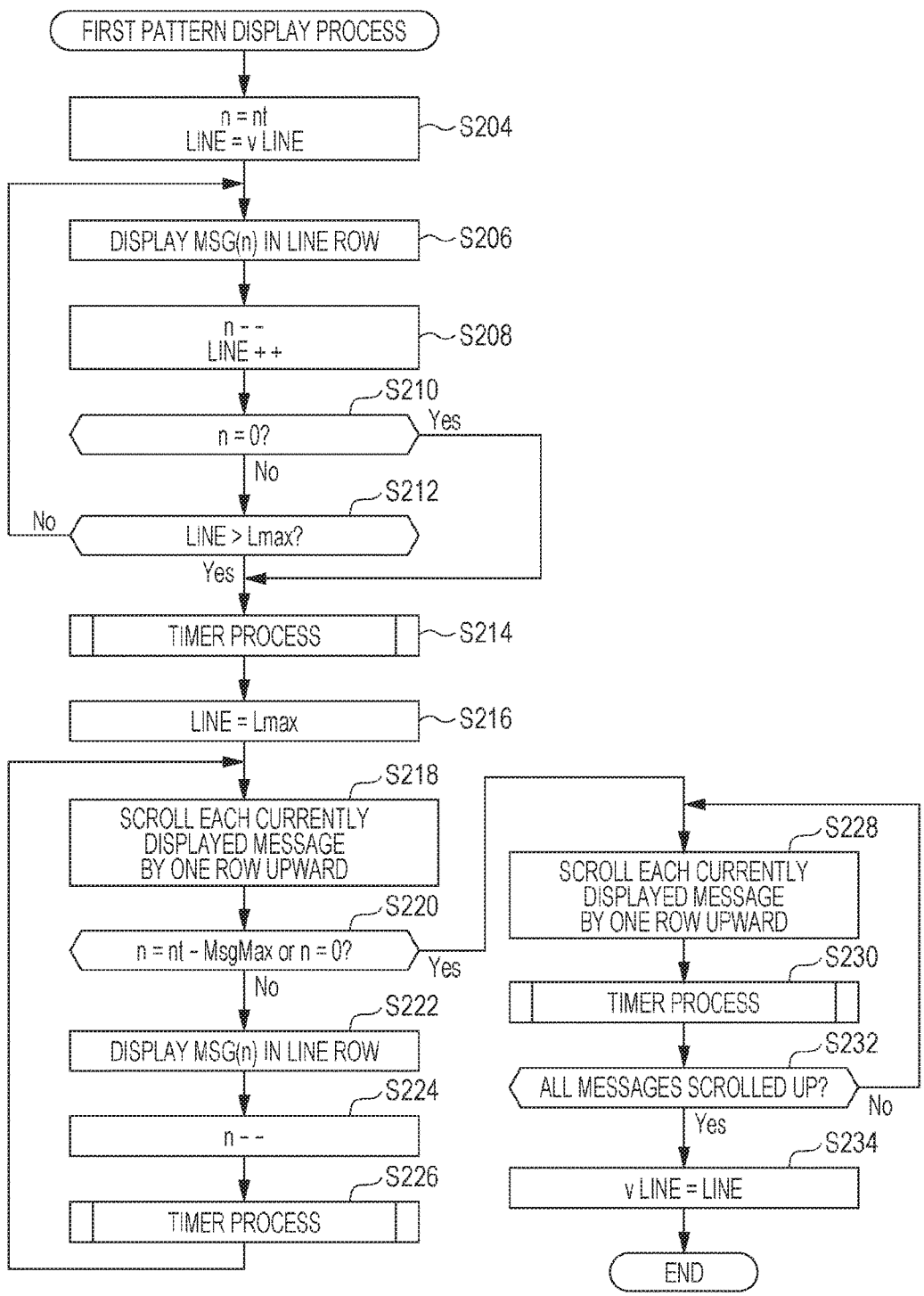
FIG. 11 illustrates a routine process (first pattern display process) of the first embodiment.

The first pattern display process performed in step S118 of FIG. 10 is described with reference to FIG. 11. The first pattern display process is performed if the message is count is smaller.

A variety of parameters are configured as initial values thereof (step S204). More specifically, the latest message number nt is configured as a message number to be displayed, and the initial display location vLINE is configured as a display location (row number) LINE where a message is displayed (step S204). The row numbers of the display location of the first embodiment range from "1" at the top row down to a maximum displayable number "Lmax" at the bottom row. In other words, the displayable number of rows (message count) is "Lmax". The message count may correspond to part of a message display region of the display area, or may extend in a lateral direction rather than a vertical direction.

In the discussion of the first embodiment, the word "row" represents a region where a single received message is displayed. If a message is long, the message is displayed by line feeding. The word "row" refers to a region where a single message is displayed.

A message character string MSG(n) is displayed in a LINE row (step S206). The received message is stored on the message array MSG(x).

In order to configure the displayed message number to an older number, the display apparatus 10 decrements n by one, and increments LINE by one to successively lower the display location (step S208).

If n becomes 0 (yes branch from step S210), all the newly received messages are displayed, and processing proceeds step S214. If n is above zero, there is still a newly received message (no branch from step S210), and the display apparatus 10 repeats the routine from the operation in step S206 to display the messages.

The messages are displayed when the region that accommodates the messages is present. More specifically, the display location LINE is equal to or below the maximum displayable number Lmax, the display apparatus 10 iterates the routine, starting with step S206 (no branch from step S212).

If the displaying of all the newly received messages is complete (yes branch from step S210) or the display location LINE exceeds the maximum displayable number Lmax (yes branch from S212), the display apparatus 10 performs a timer process (step S214). The timer process is waiting on standby for a specific period of time (waiting time, for example).

The display apparatus 10 configures the maximum displayable number Lmax to the display location LINE (step S216), and displays each message by scrolling the display location by one row upward (step S218). More specifically, the display apparatus 10 displays the messages by scrolling the messages by the number of rows corresponding to a message that is to be displayed next. The scroll method may be scrolling by one row at a time, or scrolling by the number of rows corresponding to a message.

The display apparatus 10 then determines whether all the messages have been displayed. However, if all the received messages are displayed, the number of messages to be displayed at a time is too many. For this reason, a message displayable count MsgMax may be predetermined. More specifically, the display apparatus 10 determines whether n is equal to (nt−MsgMax) or is "0", thereby determining whether the messages corresponding to the message count MsgMax backward from the latest message have been displayed (step S220).

If n is neither equal to (nt−MsgMax) or nor equal to "0" (no branch from step S220), the retrieved messages are displayable. MSG(n) is displayed on LINE row (step S222). The display apparatus 10 decrements n (step S224). After waiting on standby for the specific period of time in the timer process (step S226), the display apparatus 10 starts over again with step S218.

If n is equal to (nt−MsgMax) or equal to "0" (yes branch from step S220), the display apparatus 10 displays the messages while scrolling the display location of each message by one row upward (step S228).

The message displayable count MsgMax may now be configured to be "20". If the latest message number nt is "30", the message number n to be displayed starts with "30", and is successively decremented. When the repeated decrementing causes n to become "10", n becomes equal to the value of (nt−MsgMax), namely, "10". At this point, the display apparatus 10 determines that the messages corresponding to the message displayable count MsgMax backward from the latest message ("20" in this case) have been displayed, and then performs operations in step S228 thereafter.

After scrolling one row up, the display apparatus 10 waits on standby for the specific period of time in the timer process (step S230), and determines whether all the messages have been scrolled up (step S232). If the scrollup of all the displayed messages is not complete (no branch from S232), the display apparatus 10 repeats the routine, starting with step S228, and continues to displays the messages in a scroll-up mode.

If the scroll display of all the messages is complete (yes branch from S232), LINE is configured to be the initial display location vLINE where a message that is to be called next is displayed first (step S234).

The first pattern display process is thus defined in the case in which the message count is relatively smaller. When the message count is smaller, previously received messages are thus displayed in addition to the newly received message.

Referring to FIG. 10, the first pattern display process is repeated until the message retrieval time T has elapsed in step S120. The messages are thus repeatedly displayed without interruption.

Even if there is a smaller number of newly received messages, the messages are continuously displayed in a scroll mode, and thus draw attention of viewing users.

1.3.4 Second Pattern Display Process

Figure 12:
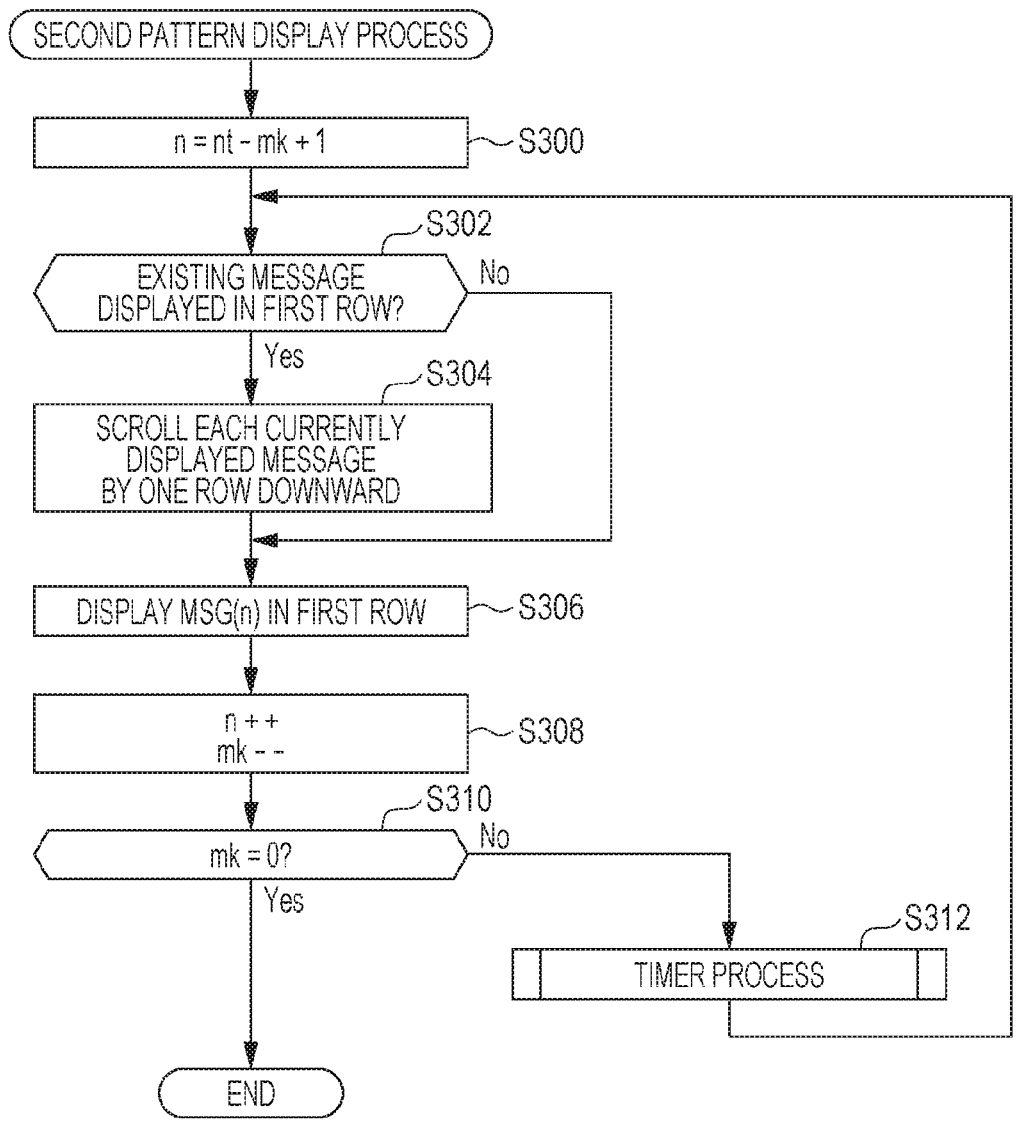
FIG. 12 illustrates a routine process (second pattern display process) of the first embodiment.

The second pattern display process performed in step S122 of FIG. 10 is described with reference to FIG. 12. The second pattern display process is performed when the message count is higher.

In order to determine messages to be displayed, (nt−mk+1) is configured to be n (step S300). More specifically, the display apparatus 10 determines n by subtracting from the latest message number (count) the newly received message count, and adding 1 to the subtraction result.

If the newly received message count is too many, the number of messages to be displayed also becomes too many. If mk is above the maximum displayable message count, mk may be configured to be the maximum displayable message count. For example, the maximum displayable message count may be configured to be "100". If the latest message count mk exceeds "100", mk is configured to be "100", and nt is decreased by 100.

If an existing message is displayed in a first row (yes branch from S302), the display apparatus 10 scrolls down the displayed messages by one row (step S304). In this case, the message displayed at the bottom row disappears as the display area shifts upward.

MSG(n) out of the subsequently retrieved messages is displayed in the first row (the top location of the display area) (step S306). The display apparatus 10 increments n, and decrements mk (step S308). In this way, 1 is added to the value of n while 1 is subtracted from the value of mk.

The display apparatus 10 determines whether mk is 0 (step S310). If mk is 0, there is no newly received message any longer, and the process ends (yes branch from S310). If mk is not 0 (no branch from S310), there is still a newly received message. After waiting on standby for the specific period of time in the timer mode (no branch from S310), processing starts over in step S302.

1.4 System Operation

1.4.1 Example of System Operation

Figure 13A:
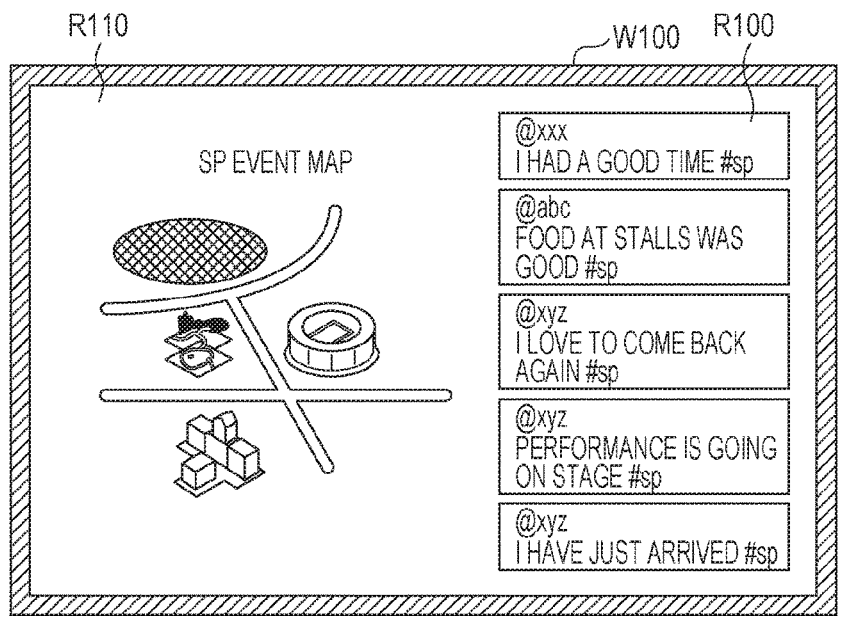
FIG. 13A through FIG. 13C illustrate operation examples of the first embodiment.

An operation of the first embodiment is described below. FIG. 13A illustrates an example of a display screen W100 of the display 110.

The display screen W100 is divided into a message display region R100 and a display region R110. The display apparatus 10 searches the messages of Twitter for a hash tag and a hit message is displayed as time line on the message display region R100. This message is retrieved from the message management server 30.

Content of program data is displayed on the display region R110. For example, information on an event venue (a map of the event venue, or a streaming video of the event) is displayed on the display region R110. The content displayed on the display region R110 is displayed in accordance with the program data delivered from the management apparatus 20.

Since the message is displayed together with the content, the display apparatus 10 provides not only sales promotion content that is typically static in related art digital signage, but also real-time information service. This increases product appeal.

In an environment that is changing from moment to moment, such as in an event currently underway, users may be provided with a useful system that is capable of displaying real-time information.

The display regions for content and messages may be determined by the display apparatus 10, or the program data may include instructions to specify the display regions. For example, the program data may include a description indicating that the message is displayed in an overlap fashion on the content or that the message and the content are displayed in a juxtaposition fashion.

The display pattern of messages on the message display region is changed in response to the retrieved message count. This provides a system that is more convenient to viewing users.

Figure 13B:
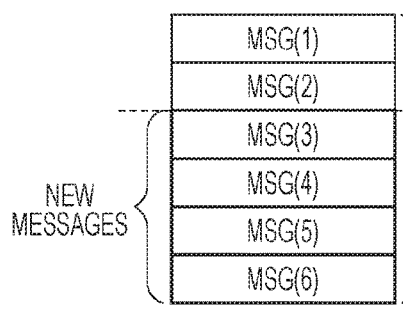
Figure 13C:
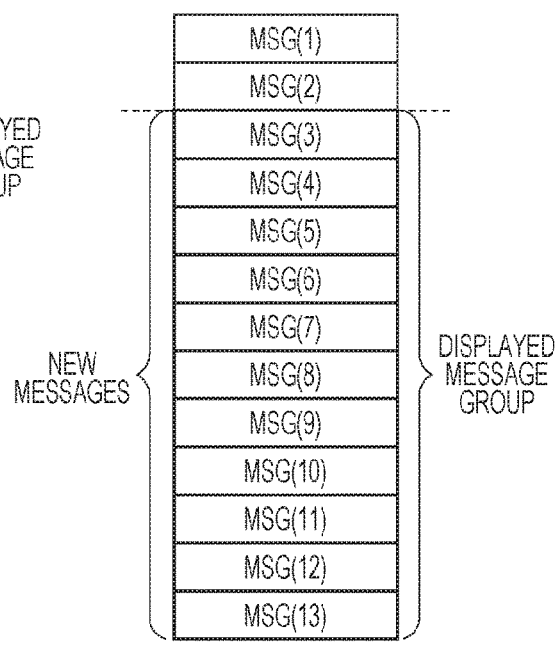

FIG. 13B and FIG. 13C schematically illustrate the range of displayed messages. Referring to FIG. 13B, the newly received message count is smaller than the display switching threshold value. Referring to FIG. 13C, the newly received message count is larger than the display switching threshold value.

As illustrated in FIG. 13B, the message count prior to receiving the new messages is 2, and the newly received message count is 4. The display switching threshold value may now be "5". Since the newly received message count is 4, a message group including past messages MSG(1) and MSG(2) and new messages down to MS(6) is processed.

The messages are repeatedly displayed until the next message retrieval time T has elapsed.

Referring to FIG. 13C, the message count prior to receiving the new messages is 2, and the newly received message count is 11. Since the messages more than the display switching threshold value ("5", for example) are received, the newly received messages MSG(3) through MSG(13) are displayed as a message group.

In accordance with the first embodiment, the message group is displayed with the content thereof changed in response to the received message count. In this case, the display pattern is different from the first pattern display process to the second pattern display process. The operation examples of the message display pattern are described below.

1.4.2 First Pattern Display Process

Figure 14A:
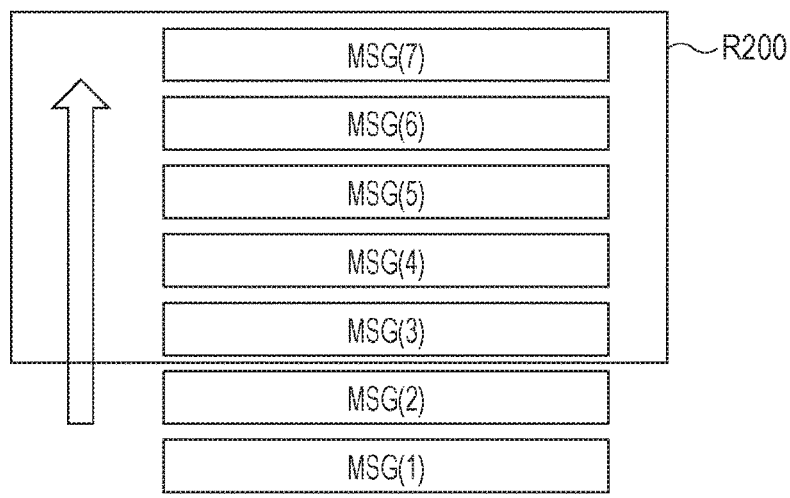
FIG. 14A through FIG. 14C illustrate operation examples (first pattern display process) of the first embodiment.

The operation example of the first pattern display process is described with reference to the drawings. The first pattern display process gives a display pattern in which the newly received message count is smaller than the display switching threshold value. FIG. 14A through FIG. 14C and FIG. 15A through FIG. 15C schematically illustrate only the message display region R100 of FIG. 13A FIG. 14A illustrate displayed message character strings including the latest MSG(7) down to MSG(6), MSG(5), . . . . Displayed on the display region R200 are messages down to MSG(3). Note that MSG(2) and MSG(1) are not displayed.

The messages MSG(2) and MSG(1) are scrolled up on the screen. The oldest message is displayed in the bottom row. If a message is newly displayed, each message is scrolled up, and the messages in the top row disappear one by one.

Figure 14B:
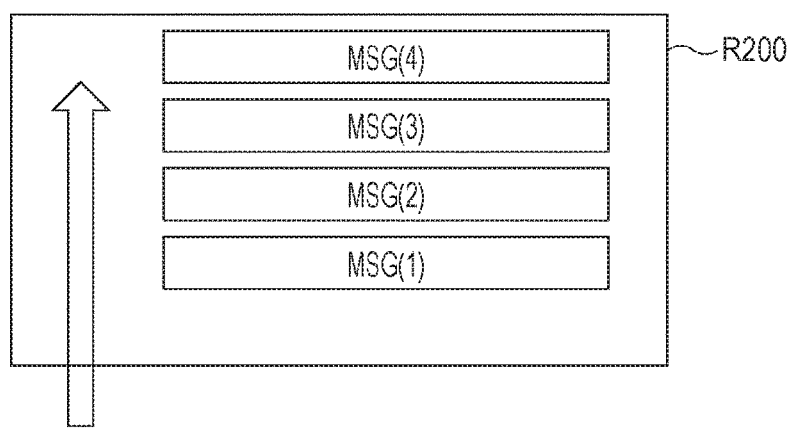
Figure 14C:
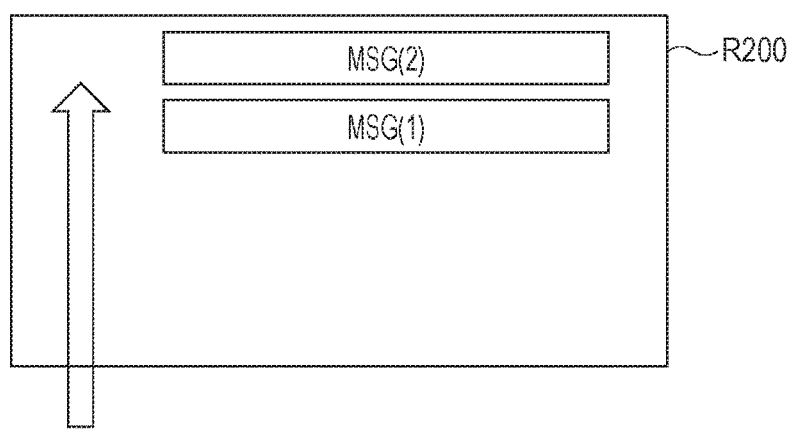

Through the scrollup operation, only MSG(4) through MSG(1) are displayed as illustrated in FIG. 14B. As the scrollup operation continues further, only MSG(2) and MSG(1) are displayed.

Figure 15A:
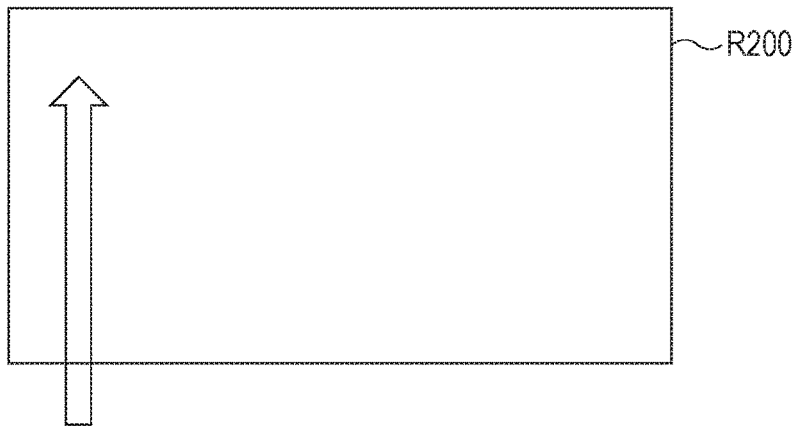
FIG. 15A through FIG. 15C illustrates operation examples (first pattern display process) of the first embodiment.

As the scrollup operation continues further, MSG(1) is scrolled up, and the display apparatus 10 reaches the state of FIG. 15A. In this state, no message is displayed on the display region 200. The scrollup operation is performed and all the messages disappear.

In accordance with the first embodiment, all the messages disappear once. Alternatively, a specific time interval may be permitted. For example, a new message may be displayed after a specific time interval corresponding to several messages.

Figure 15B:
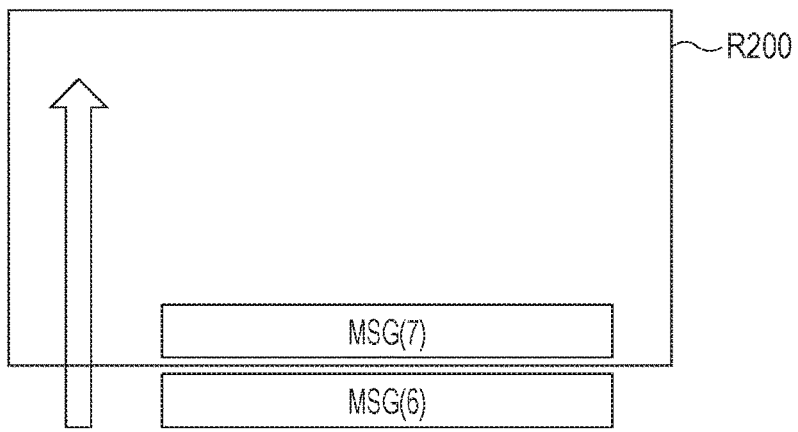
Figure 15C:
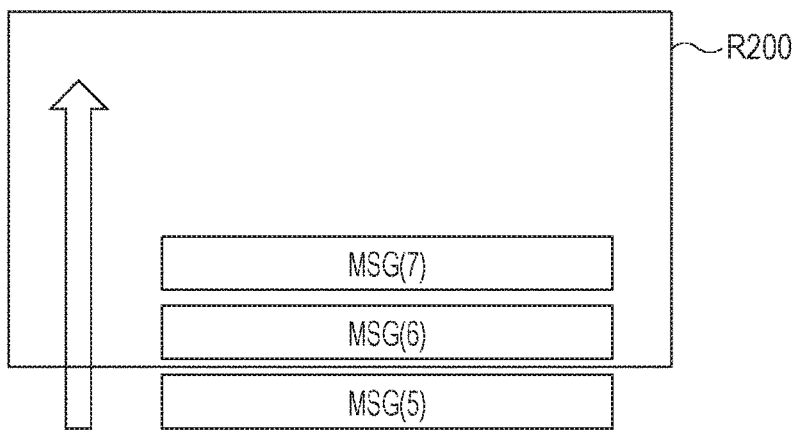

If the first pattern display process is performed again, a message is displayed in the bottom row (FIG. 15B). As illustrated in FIG. 15B, MSG(7) that is the latest message is displayed. The messages are successively displayed in the scrollup operation. For example, MSG(7) is scrolled up with MSG(6) appearing in the bottom row (FIG. 15C).

1.4.3 Second Pattern Display Process

Figure 16A:
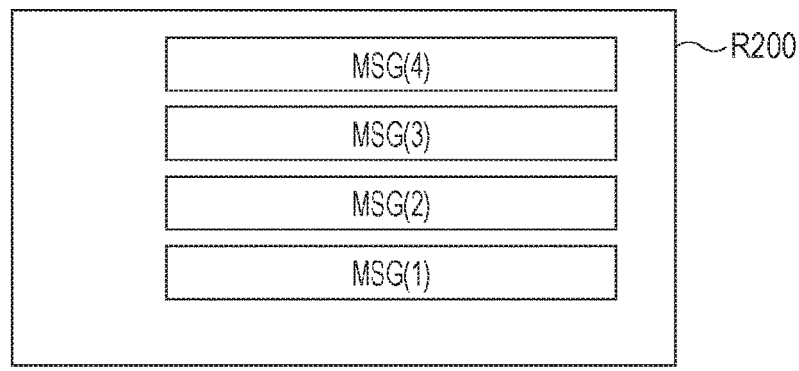
FIG. 16A through FIG. 16C illustrate operation examples (second pattern display process) of the first embodiment.
Figure 16B:
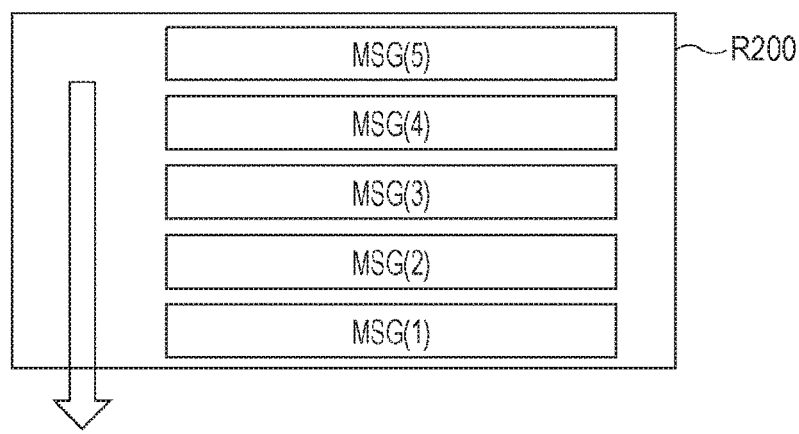
Figure 16C:
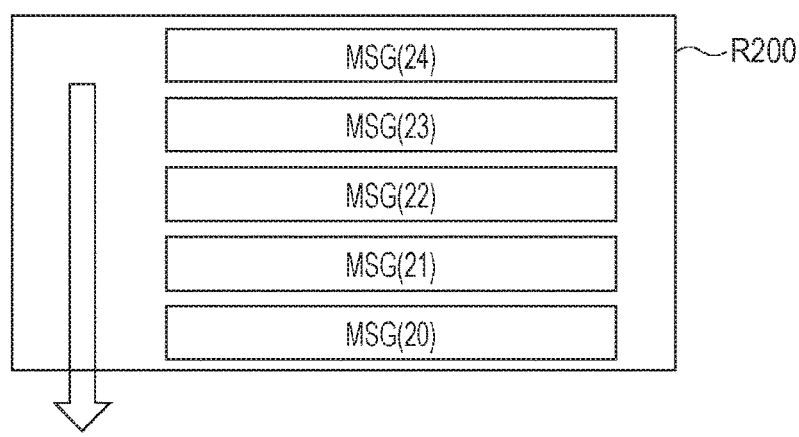

Operation examples of the second pattern display process are described below. In the second pattern display process, the newly received message count is higher than the display switching threshold value. FIG. 16A through FIG. 16C schematically illustrate the message display region R100 of FIG. 13.

Referring to FIG. 16A, the displayed messages include a new message MSG(4) in the top row and an old message in the bottom row. In order to display a new message MSG(5) in this state, MSG(5) appears in the top row as illustrated in FIG. 16B.

MSG(1) through MSG(4) displayed previously are scrolled down. The new message is thus displayed in the top row. Each time a new message is displayed, the messages are scrolled down.

FIG. 16C illustrates the messages with MSG(24) displayed. As a new message displayed in the top row, the older messages are scrolled down in a manner such that the oldest message disappears.

2. Second Embodiment

A second embodiment is described below. In the second embodiment, the message display pattern is switched in response to the actual value of a past retrieval count (mean value).

Figure 17:
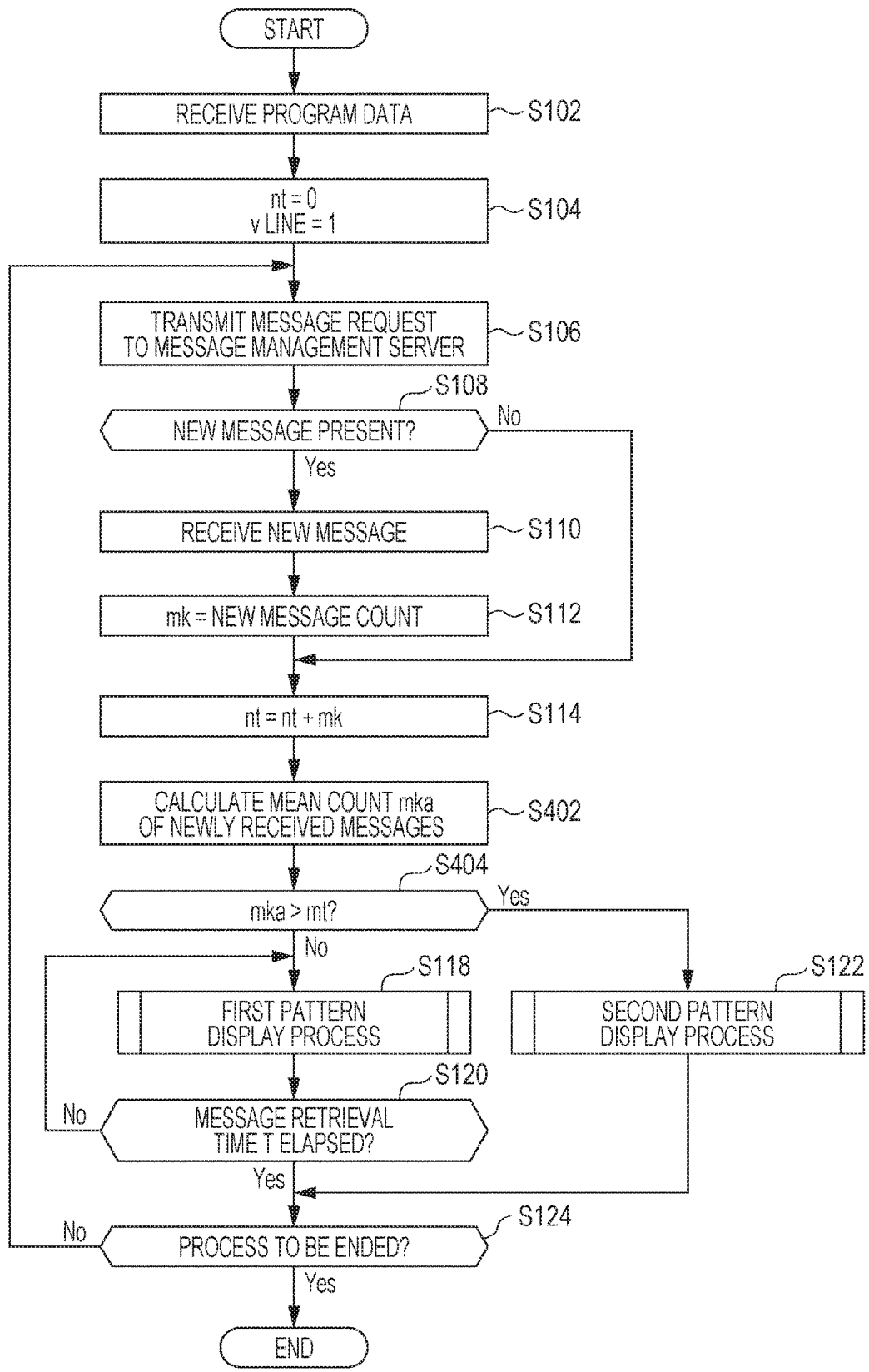
FIG. 17 illustrates a routine process of a second embodiment.

The second embodiment is identical in configuration to the first embodiment, and performs a routine process of FIG. 17 in place of the routine process of FIG. 10. Referring to FIG. 17, the same operations are designated with the same reference symbols, and the discussion thereof is omitted herein.

In accordance with the second embodiment, the display apparatus 10 calculates a newly received message mean count mka as the mean value of newly received messages after retrieving the new messages (step S402). More specifically, the display apparatus 10 calculates as the newly received message mean count mka the mean value of the past retrieved counts of messages (for example, of 5 rounds).

The display apparatus 10 switches between the first pattern display process and the second pattern display process by comparing the newly received message mean count mka with the display switching threshold value mt (step S404).

In accordance with the second embodiment, the determination is made, based on the message received counts of past several rounds. The messages are thus switched more reliably.

3. Third Embodiment

A third embodiment is described below. In the third embodiment, the message retrieval frequency is modified.

(1) The message retrieval frequency in the first pattern display process is increased.

Figure 18:
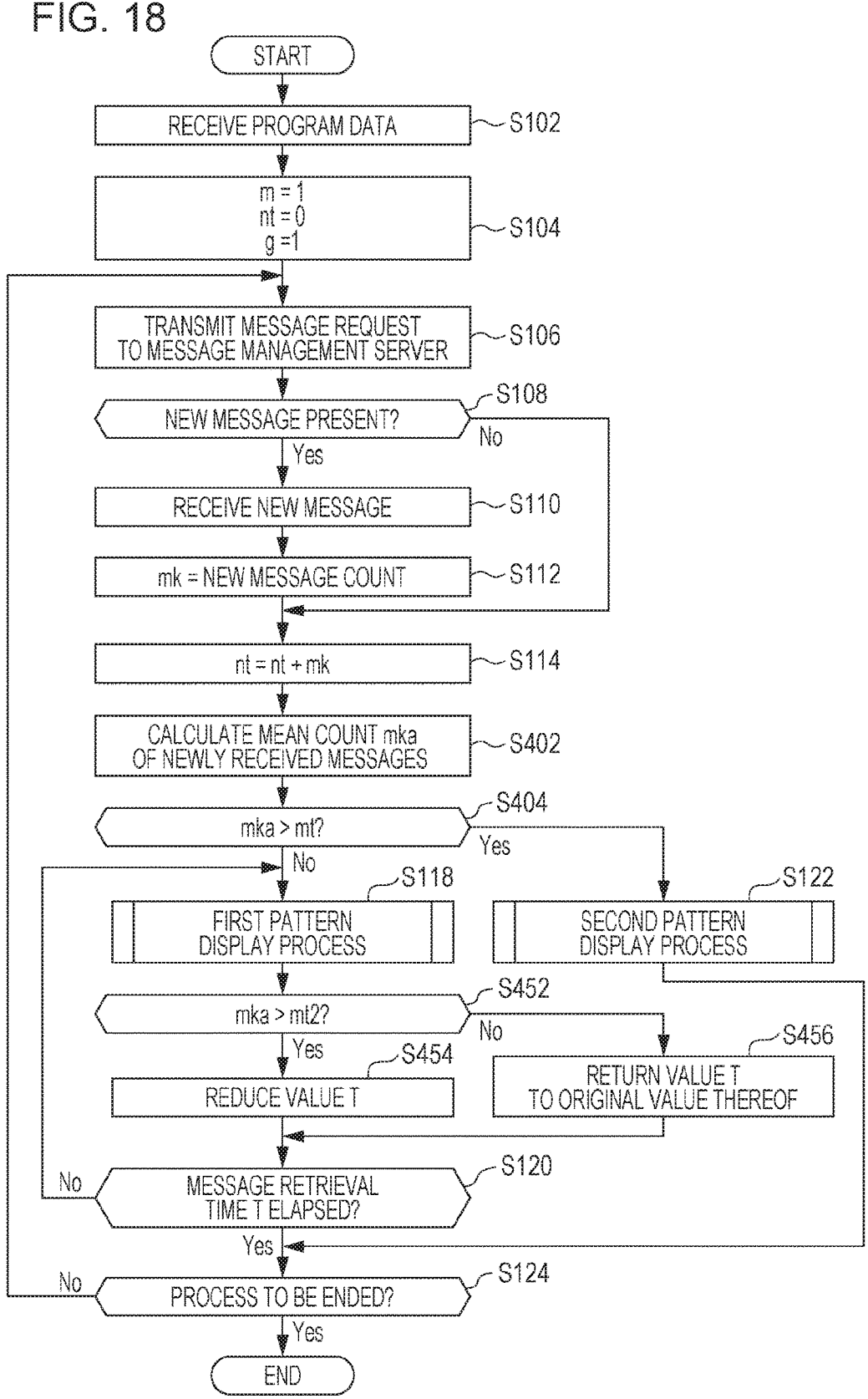
FIG. 18 illustrates a routine process of a third embodiment.

In the third embodiment, the message retrieval frequency is increased. The third embodiment is identical in configuration to the first and second embodiments, and has a routine process of FIG. 18 in place of the routine process of FIG. 17. In FIG. 18, the same operations are designated with the same reference symbols, and the discussion thereof is omitted herein.

After the first pattern display process or the second pattern display process is performed, the display apparatus 10 determines whether the newly received message mean count mka is higher than a mean retrieval count threshold value mt2 as a specific threshold value (step S452). If the newly received message mean count mka is higher than the mean retrieval count threshold value mt2 (yes branch from S452), the display apparatus 10 shortens the message retrieval time T (step S454).

If the newly received message mean count mka is equal to or below the mean retrieval count threshold value mt2 (no branch from S452), the display apparatus 10 causes the message retrieval time T to revert back to the original value thereof (step S456).

In accordance with the third embodiment, the value of the message retrieval time T is modified in response to the past retrieval count. If the newly received message count is higher, the message retrieval count is increased (regular retrieval time is shortened).

In accordance with the third embodiment, the message retrieval time T is modified in accordance with the mean newly received message count. Alternatively, this method may be applied to the first embodiment. More specifically, the message retrieval time T may be modified in response to the newly received message count.

More specifically, if the latest message count mk is higher than a specific threshold value (mt2 or another threshold value), the value of the message retrieval time T may be reduced. The parameters that may be used to modify the message retrieval time T may include the newly received message count or the mean value of the newly received message counts.

(2) The message retrieval frequency in the first pattern display process is lowered.

Conversely, the message retrieval frequency is lowered. More specifically, the operation in step S456 is set to be "Increase value T" and the operation in step S454 is set to be "Return value T to original value thereof".

If the newly received message count or the mean value of newly received message counts is lower the threshold value, the message retrieval time is increased by increasing the message retrieval time T.

(3) The message retrieval frequency in the second pattern display process is modified.

In the second pattern display process, the message retrieval time T may be modified in accordance with the newly received message count or the mean value of newly received message counts. In other words, operations in steps S452 through S456 may be performed between steps S122 and S124 instead of between steps S118 and S120.

If the newly received message count is higher in the second pattern display process, the message retrieval time T may be shortened.

4. Fourth Embodiment

A fourth embodiment is described below. In the fourth embodiment, the message display pattern is switched in response to the message count within a specific period of time, for example the message count subsequent to a given time point, rather than in response to the newly received message count.

Figure 19:
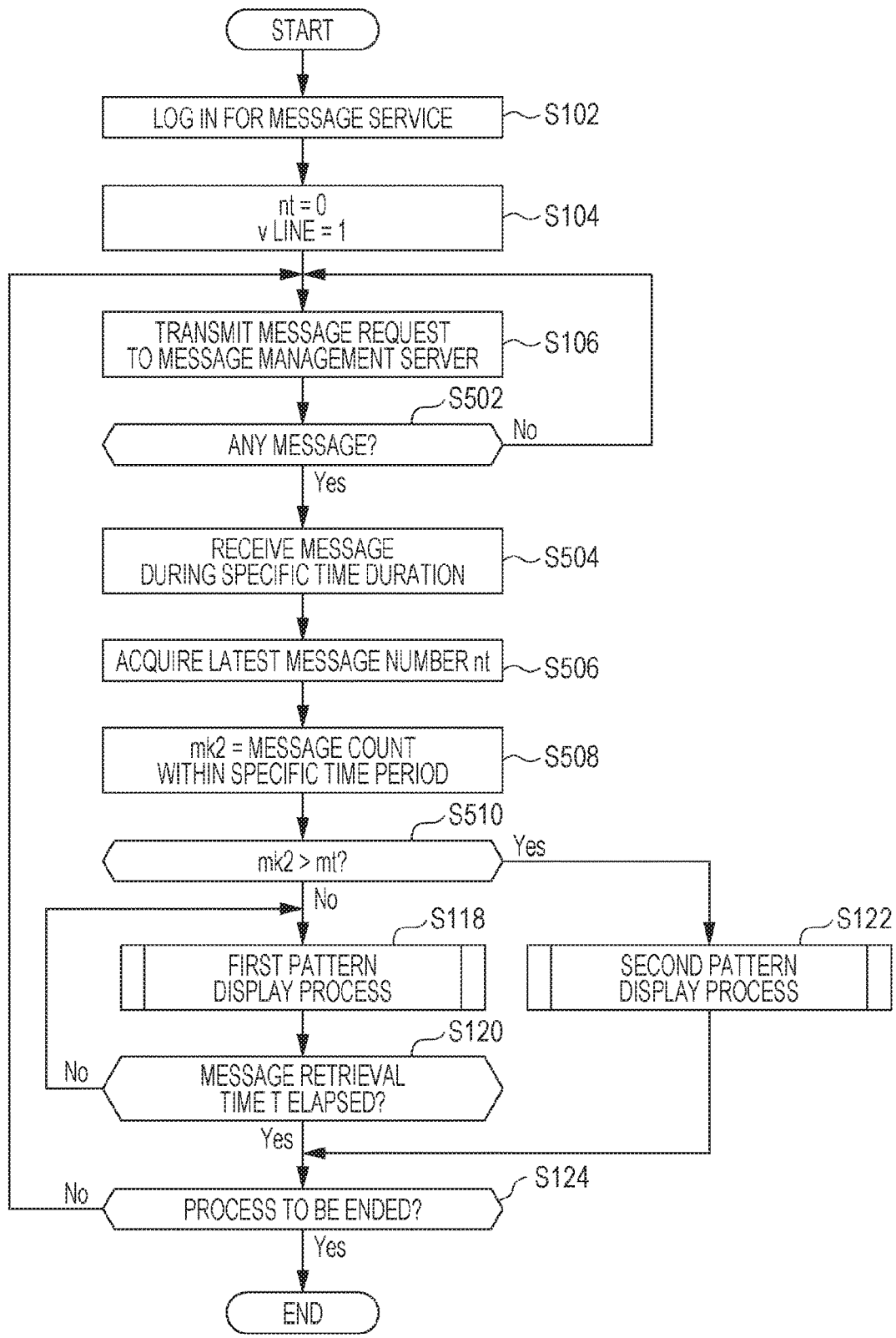
FIG. 19 illustrates a routine process of a fourth embodiment.

The fourth embodiment is identical in configuration to the first embodiment, and operates in accordance with a routine process of FIG. 19 in place of the routine process of FIG. 10.

In step S106, the display apparatus 10 transmits a message request to the message management server (step S106). If there is a message (yes branch from S502), the display apparatus 10 receives the message within a specific period of time (the message after a specific time point) (step S504).

The messages to be received may include messages that are based on search information or all the received messages. The display apparatus 10 receives the current latest message number nt (step S506), and configures a message count of messages within the specific period of time, out of the received messages, to be mk2 (step S508).

The message count of the messages within the specific period of time may be a message count of the messages after a specific time point, or a message count of the messages which have been received within a specific period of time (such as "10 minutes" or "20 minutes"). The display pattern is changed in response to the message count of the messages falling within a message count determination time period. The message count determination time may be any time period, but may be desirably longer than the message retrieval time T that is a time period throughout which the messages are retrieved.

More specifically, if mk2 is higher than mt (yes branch from S510), the second pattern display process is performed (step S122). If mk2 is equal to or below mt (no branch from S510), the first pattern display process is performed (step S118).

The first pattern display process and the second pattern display process are performed with mk=mk2.

In accordance with the fourth embodiment, the display method is changed in response to the message count within the specific period of time rather than the newly received message count. The display method is useful for displaying messages after the beginning of an event or messages within business hours.

5. Fifth Embodiment

A fifth embodiment is described below. In the above embodiments, a hash tag is used as the search information. In the fifth embodiment, other information may be used.

The management apparatus 20 uses a display account for the display apparatus 10. Using the display account, the management apparatus 20 follows an account to be displayed. By simply obtaining time line for the display account, a desirable message may be displayed.

A more appropriate message may thus be displayed by following a follower account, such as a store account of a store in a shopping mall, or an account in a train station providing operation information.

Another account ID other than the hash tag may be specified. If messages include position information, a message with the position information attached thereto may be specified.

6. Sixth Embodiment

A sixth embodiment is described below. In the sixth embodiment, the message display is switched between in a partitioned-region fashion or in a content-overlapped fashion, depending on the message count.

Figure 20:
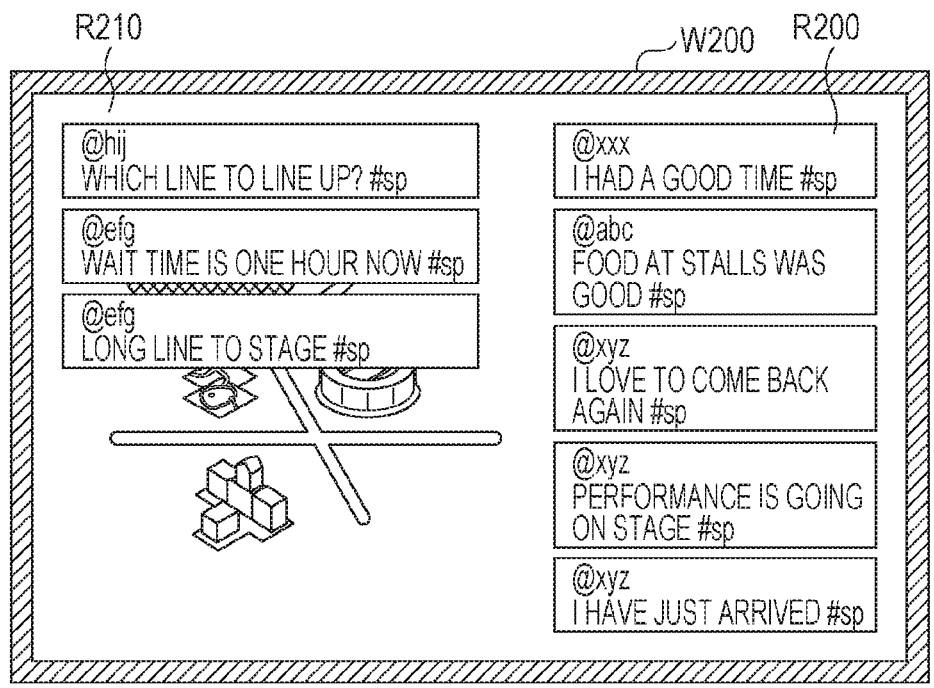
FIG. 20 illustrates an operation example of a sixth embodiment.

FIG. 20 is a display version modified from the display example of FIG. 13A and an example of a display screen W200 displayed on the display 110 in accordance with the sixth embodiment.

In the above embodiments, the scroll-display method is switched in response to the message retrieved count. In accordance with the sixth embodiment, the messages are displayed on the message display region R200 if the retrieved message count is lower than a display region switching threshold value as a specific value, and the messages are displayed on content displayed on the display region R210 if the retrieved message count is higher than the display region switching threshold value. The scroll display method may be identical to the process described with reference to the first embodiment.

If the retrieved message count is lower than the specific value and older messages are displayed on the display region R210, these messages may be transferred to the message display region R200 and then scrolled.

7. Seventh Embodiment

A seventh embodiment is described below. In the seventh embodiment, only the messages are displayed while the content is not displayed.

In the preceding embodiments, the content and the messages are displayed together. Even if only the messages are displayed, the message display method described above may be used.

Figure 21:
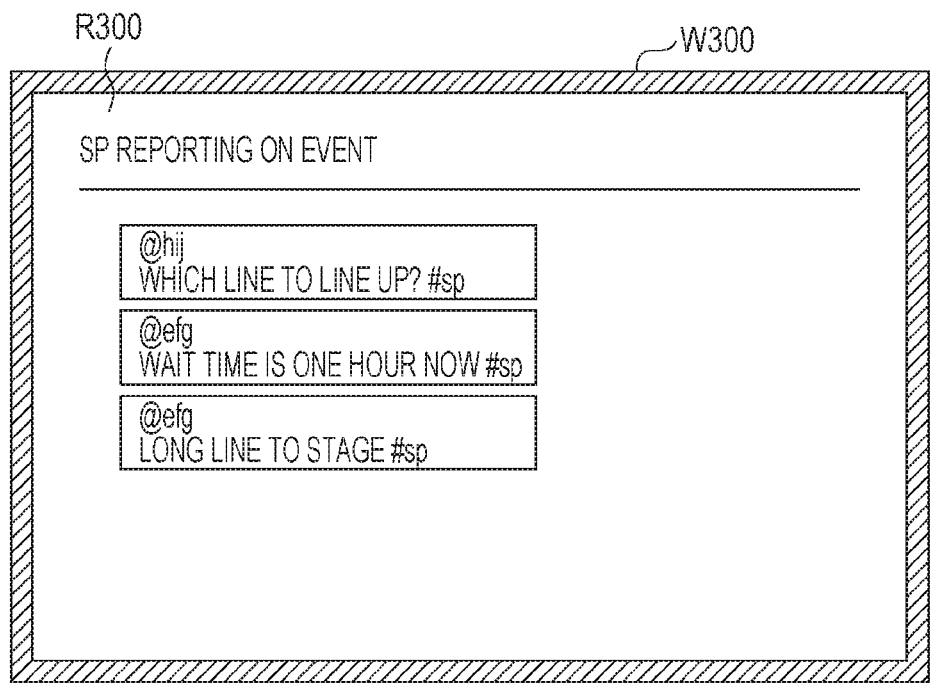
FIG. 21 illustrates an operation example of a seventh embodiment.

Retrieved messages are displayed on a region R300 on a display screen W300 of FIG. 21. Although no content is displayed on the display screen W300, the messages are efficiently displayed.

Such a display form may be particularly useful when a message is desirably displayed separately from content, or when a message is displayed on a small-sized display device, such as of a point of sales system (POS), of an image forming apparatus, or of a vending machine.

8. Eighth Embodiment

An eighth embodiment is described below. In the eighth embodiment, the terminal apparatus 40 operates as a display apparatus.

In the preceding embodiments, the content and the messages are displayed on the display apparatus 10. Recently, however, information has been delivered to and displayed on a user's terminal apparatus (such as a smart phone or tablet) or information has been delivered to and displayed on a car navigation system.

In such a case, push information may be delivered in a manner different from application software in standard social networking service (SNS). More specifically, a message may be displayed when a specialized application is started up on the terminal apparatus 40 or when a page of a browser is displayed.

Figure 22:
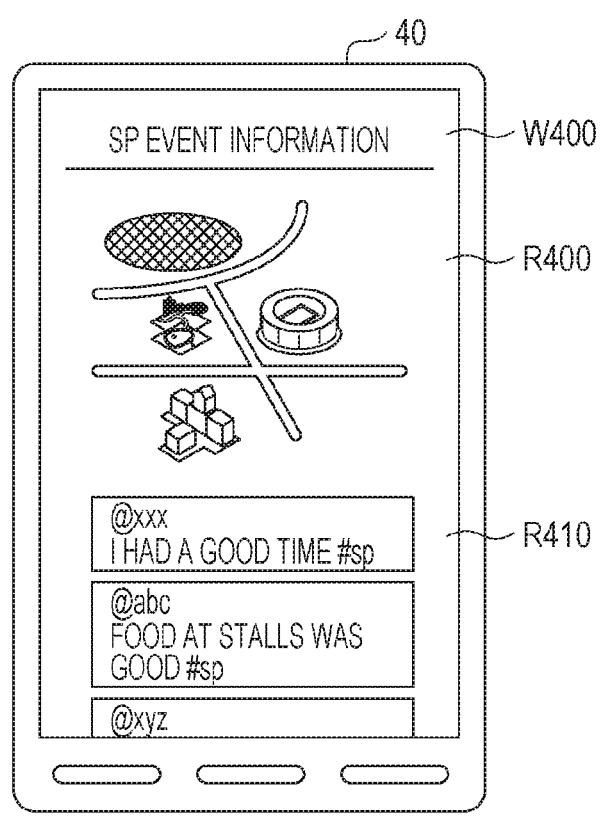
FIG. 22 illustrates an operation example of an eighth embodiment.

FIG. 22 illustrates an operation example in which an application having a functionality of displaying a message on the terminal apparatus 40 starts up. In this case, content is displayed on a region R400 on the display screen W400, and a message (group) is displayed on a message display region R410.

Such an application may be distributed by a shopping mall or a transportation operator to provide information thereabout. Each user may easily obtain the information by executing the application.

In accordance with the eighth embodiment, the message display method described with reference to the preceding embodiments is used to display the message on the terminal apparatus 40.

9. Modifications

The embodiments have been described with reference to the drawings. The present disclosure is not limited to the embodiments, and designs that fall within the scope of the disclosure are defined by the Claims.

In accordance with the embodiments, the scrollup operation is performed in the first pattern display process and the scrolldown operation is performed in the second pattern display process. The operations may be reversed. In other words, the scrolldown operation is performed in the first pattern display process and the scrollup operation is performed in the second pattern display process.

The scroll display has been described as a method of updating the messages. Alternatively, another method may be used. For example, the character string may fade out or laterally slid. Another method may be implemented as long as the time line is appropriately updated.

A program running on each apparatus in the embodiments controls a central processing unit (CPU) (a program causing a computer to function) such that each functionality of the embodiments is implemented. Information handled by each apparatus is stored on a temporary memory (such as a random-access memory (RAM)), then stored on a storage device, such as a read-only memory (ROM) or a hard disk drive (HDD) when the information is processed. The information is then read, corrected, or written on the storage device by the CPU as appropriate.

The program may be distributed in a form stored on a portable recording medium, or transmitted to a server computer via a network, such as the Internet, connected to the server computer. In such a case, a storage device in the server computer falls within the scope of the disclosure.

The present disclosure contains subject matter related to that disclosed in Japanese Priority Patent Application JP 2016-192032 filed in the Japan Patent Office on Sep. 29, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus including a display that displays messages, comprising:
    a message retrieval unit that retrieves messages by accessing a message management server;
    a display method selection unit that selects a display method for the retrieved messages in response to a count of the retrieved messages; and
    a display controller that performs control to display on the display the messages retrieved from the message management server in the display method selected by the display method selection unit,
    wherein the display method selection unit selects a first display method that displays the retrieved messages while scrolling the retrieved messages repeatedly if the count of the retrieved messages is equal to or below a display switching threshold value, and selects a second display method that displays the retrieved messages while scrolling the retrieved messages if the count of the retrieved messages is above the display switching threshold value.

2. The display apparatus according to claim 1, wherein the display controller displays a message group including a previously retrieved message and the retrieved messages while scrolling the message group repeatedly if the first display method is selected.

3. The display apparatus according to claim 2, wherein the display controller displays the message group repeatedly if the first display method is selected and a message display period has not exceeded yet a message retrieval time period.

4. The display apparatus according to claim 1, where a direction of scrolling in the first display method is different from a direction of scrolling in the second display method.

5. The display apparatus according to claim 1, wherein the display controller repeatedly displays the messages while scrolling the messages in a direction from a younger message to an older message if the first display method is selected, and displays the messages while scrolling the messages in a direction from an older message to a younger message if the second display method is selected.

6. The display apparatus according to claim 1, wherein the message retrieval unit retrieves a message that the message management server has searched for and hit according to search information stored thereon.

7. The display apparatus according to claim 1, wherein the message retrieval unit comprises:
    a message request transmitter that transmits to the message management server a message request including search information; and
    a message receiver that receives from the message management server a message that the message management server has searched for and hit.

8. The display apparatus according to claim 1, wherein the message retrieval unit further comprises a time configurator that configures a message retrieval time period throughout which the message retrieval unit retrieves a message from the message management server, and
    wherein the time configurator modifies the message retrieval time period in response to the count of the retrieved messages.

9. The display apparatus according to claim 1, wherein the display displays content, and
    wherein the display controller displays the message together with the content.

10. The display apparatus according to claim 9, wherein the display controller displays the content and the message respectively on partitioned regions of the display.

11. The display apparatus according to claim 9, wherein the display controller displays the content and the message in a manner such that the message overlaps the content.

12. A display control method for a display apparatus having a display that displays messages, comprising:
    retrieving messages by accessing a message management server;

selecting a display method for the retrieved messages in response to a count of the retrieved messages; and performing control to display on the display the messages retrieved from the message management server in the selected display method, wherein the selecting includes selecting a first display method that displays the retrieved messages while scrolling the retrieved messages repeatedly if the count of the retrieved messages is equal to or below a display switching threshold value, and selecting a second display method that displays the retrieved messages while scrolling the retrieved messages if the count of the retrieved messages is above the display switching threshold value.

13. A non-transitory computer readable recording medium having stored a program that performs a process for displaying, the process comprising:

retrieving messages by accessing a message management server;

selecting a display method for the retrieved messages in response to a count of the retrieved messages; and performing control to display on the display the messages retrieved from the message management server in the selected display method, wherein the selecting includes selecting a first display method that displays the retrieved messages while scrolling the retrieved messages repeatedly if the count of the retrieved messages is equal to or below a display switching threshold value, and selecting a second display method that displays the retrieved messages by scrolling the retrieved messages if the count of the retrieved messages is above the display switching threshold value.

* * * * *